Jan. 14, 1964   J. M. DODWELL   3,117,660
CLUTCH
Filed Jan. 27, 1961   2 Sheets-Sheet 1
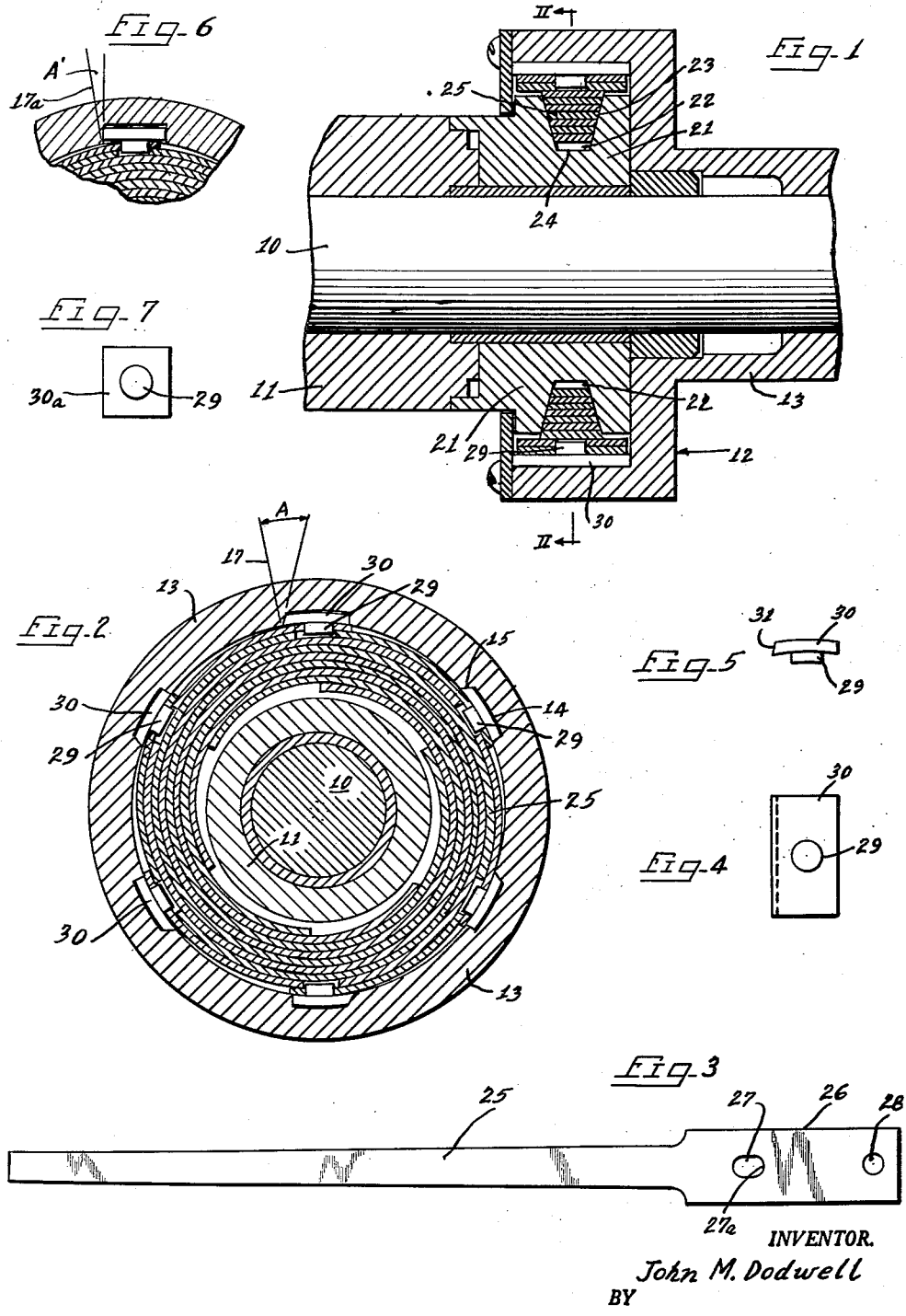
INVENTOR.
John M. Dodwell
BY
ATTORNEYS Jan. 14, 1964     J. M. DODWELL     3,117,660
CLUTCH
Filed Jan. 27, 1961     2 Sheets-Sheet 2
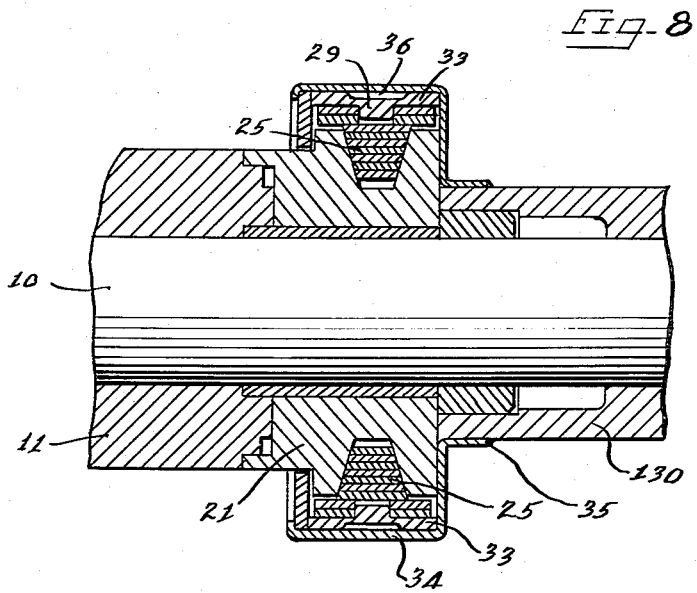
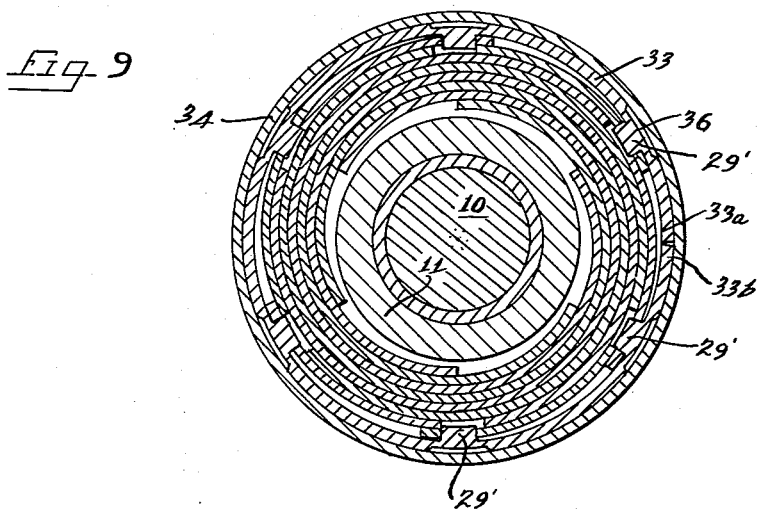
INVENTOR.
John M. Dodwell

United States Patent Office 3,117,660
Patented Jan. 14, 1964

3,117,660
CLUTCH
John M. Dodwell, Piedmont, Quebec, Canada
(402½ Rynearson St., Buchanan, Mich.)
Filed Jan. 27, 1961, Ser. No. 85,330
14 Claims. (Cl. 192—41)

The present invention relates to improvements in the art of free-wheeling or overrunning clutches and is, more particularly, concerned with the provision of a substantially improved clutch of the overlapping torque-transmitting band friction type clutch of the general type disclosed in my prior United States Letters Patent Nos. 2,518,453 and 2,895,577.

As has been more fully described in my above-mentioned earlier patents, an overrunning or one-way clutch of very satisfactory operational characteristics may be constructed by providing a plurality of overlapping, substantially circular, bands secured to a first rotary clutch member and engageable in overlapping fashion in a V-groove in a second member to be clutchingly engaged with the first clutch member. The natural resiliency of the torque transmitting bands tends to maintain them in radially inwardly directed contact with the sidewall surfaces of the V-groove and the bands wedgingly grip the sidewalls of the V-groove when the clutch parts are rotated in a direction tending to wrap the bands around the grooved member. Rotation of the parts in the opposite direction relative to each other provides a slight frictional force tending to force the overlapping bands outwardly, radially, in an unwrapping direction thereby providing free relative rotation between the clutch parts.

I have found that clutches constructed in accordance with my earlier patents have unusually high torque transmitting efficiency and are capable of surviving many tens of thousands of clutch-declutch cycles of operation. However, in some specialized applications, and particularly those requiring hundreds of thousands of cycles of operations without failure under widely varying, and sometimes excessive, loads, physical failures of the bands may prematurely occur. Such failures, even though due only to improper overload conditions of operations, nevertheless, may place limitations on the use of the clutching mechanism for some extremely heavy duty purposes. Where failures have occurred in such excessive load use, they have ordinarily occurred as a result of fractures of one or more of the bands adjacent the point of securement to the member carrying them. Thus, while it is extremely rare for a band to break along its length engaging the sidewalls of the V-groove, some breaks have occurred in the band in the portion thereof not in the V-groove.

The present invention has for a major object, an improved securing structure for attaching the force-transmitting bands to the housing member carrying them. In accordance with the principles of the present invention, the ends of the bands fixed in the said carrying portion are secured to that portion in a manner providing a greater strength of the band at the point of securement than exists at the point where the band initially enters the V-groove. Accordingly, in accordance with the present invention, the band clutch members will not break until such time as a torque force sufficient to rupture the band itself at the pulley groove, is applied. Such a force is, of course, the ultimate load-carrying limit of the clutch mechanism and the provision of a strength in the band at its point of connection in excess of or at least equal to such fracturing force provides a clutch band of substantially maximum strength.

In accordance with the present invention, radial flexing of the bands along their lengths at the point of securement to the housing is prevented. Additionally, torque applied to the individual bands is transferred from the band-carrying housing to the band itself by means of at least one, and on occasion several, pin connections. By properly proportioning the band members relative to the pin contacting apertures, a clutch has been provided which is capable of continued operation at high torque loadings without injury.

In accordance with the teachings of the present invention, each clutch band member is provided with a plurality of pin-engaging holes. A solid pin, secured to the housing member of the clutch, is passed through the pin-engaging apertures. The apertures in the individual bands are spaced longitudinally of the band a distance slightly different from the peripheral distance between pins located in the clutch housing so that upon the application of a tension force to the band relative to the supporting pin, only one pin will initially be engaged, but upon the continued application of force the second clutch pin would, as a result of stretching of material, also engage. As a result, the load applied to the securing means for the individual bands is transferred to the band carrying housing by more than one pin and, similarly, more than one opening in the respective bands.

In addition to the novel arrangements above discussed, it will be observed that the present invention provides a simple and extremely inexpensive clutch apparatus. The machining tolerances necessary for satisfactory operation of the clutch are ordinary tolerances capable of ready achievement. Further, as a relief of the operative combination hereinafter more fully set forth, a one-way friction band type clutch of unusually high efficiency is achieved.

A further embodiment illustrated in the present application comprises a unitized band-retaining key construction wherein all of the pin connections are provided on an outer ring. This ring is tightly fitted into a hub bore under a predetermined tension. This tension is several times the ordinary maximum required drive torque of the clutch and provides an overload relief particularly suited to the overload problems encountered in automotive vehicle starter drive systems.

It is, accordingly, an object of the present invention to provide a substantially improved one-way clutch.

Another object of the present invention is to provide a substantially strengthened one-way clutch of the wedging flexible torque-transmitting friction band type.

Still a further object of the invention is to provide an improved and strengthened attachment means for the flexible torque-transmitting bands of a one-way clutch whereby flexure of the individual bands at their points of attachment is eliminated and whereby the strength of the attachment is at least as great as the flexion wedging portion of the band.

A feature of a form of the invention is the utilization of a pair of securing keys with each band.

A further feature of the invention is the provision of an improved pin connection for a torque-transmitting band.

Still a further object of the present invention is to provide a simplified and substantially reduced in size one-way or overrunning clutch capable of handling exceptionally high overload torque without damage to the clutch.

Still a further object of the present invention is to provide an extremely small size clutch capable of handling exceptionally high overload torques and additionally incorporating a slit mechanism permitting the clutch to slip at, but only at, attainment of a very high overload torque.

Still a further feature of the invention resides in the securement of the clutch bands to a generally cylindrical pin carrying member which is in turn fitted in a tight braking fit with the clutch housing to provide a slip fit therewith at torques above a predetermined overload value.

Still other and further objects and features of the present invention will at once become apparent to those skilled in the art from a consideration of the attached drawings wherein a preferred embodiment of the invention is shown by way of illustration only, and wherein:

FIGURE 1 is an elevational view in cross-section illustrating a one-way drive application of the present invention;

FIGURE 2 is a cross-sectional view taken along the line II—II of FIGURE 1;

FIGURE 3 is a plan view of an individual clutch band constructed in accordance with the present invention;

FIGURE 4 is a plan view of a clutch band securing key constructed in accordance with the present invention;

FIGURE 5 is a side-elevational view of the key illustrated in FIGURE 4;

FIGURE 6 is a partial side-elevational view of a modified form of the clutch incorporating a square key construction;

FIGURE 7 is a plan view of the clutch band securing key shown in FIGURE 6;

FIGURE 8 is a side-elevational view in cross-section illustrating a further embodiment of a one-way drive application of the present invention; and FIGURE 9 is a cross-sectional view taken along the line IX—IX of FIGURE 8.

As shown on the drawings:

As shown in the embodiment illustrated in FIGURES 1 and 2, the present invention may be incorporated in a clutch having contentional drive and driven shafts. For example, in the form illustrated, which comprises an automotive starter clutch, the drive shaft 10 is drivingly connected to the electric starter motor output drive shaft or gear 11 through the one-way clutch mechanism generally indicated at 12. The output shaft or gear 11 is adapted for engagement with the conventional flywheel ring gear, not shown.

The one-way clutch 12 comprises a housing 13 which is secured for rotation with the drive shaft 10. The housing 13 is formed, as shown, with six peripheral pockets 14 having walls 15 facing in the free-wheeling direction of rotation of the housing 13 which are positioned at an angle A relative to a respective radial line 17. As illustrated, the angle A preferably approximates 15° and provides an important function described below.

The driven, or output, portion of the clutch member illustrated in FIGURES 1 and 2 comprises a member 21 having a V-groove 22. The walls 23 of the V-groove 22 cooperate with one or more, but preferably a plurality of, torque-transmitting bands 25 each of which is initially precurved to a diameter of curvature slightly less than the diameter of the bottom 24 of the V-groove 22. Each of the bands 25 comprises a length of spring metal of substantially constant thickness and having a slight taper to its width, thus gradually reducing its width as it approaches its free end. This permits the free end of the band to drop gradually deeper into the groove 22, as clearly illustrated in FIGURE 2, thereby assuming a position of somewhat spiral form. In clutch structures of the present invention employing only a single band 25 it is preferred that the band overlap itself around the pulley member 21 to aid in stabilizing the band in the groove.

In accordance with the present invention, the individual bands 25 are provided with a wide securing end indicated at 26. The total width of the end 26 is, as illustrated in FIGURE 3, approximately twice the width of the tapered portion of the band. The portion 26 is provided with a pair of apertures 27 and 28, each of which has a width approximately one-fourth of the width of the portion 26 as illustrated. It will be apparent that the cross-sectional area of the band through its weakest securing section, namely a section through either aperture 27 or 28, will, as a result of the substantial width of section 26, be in excess of the width of the tapered portion of the band, thereby providing a securing portion 26 which is stronger, if anything, than the torque-transmitting tapered portion of the band.

As may be seen from a consideration of FIGURE 3, the aperture 28 comprises a round hole which is of substantially the same diameter as the co-operating pin 29 on key 30. However, aperture 27 is longitudinally elongated slightly to permit free passage of the end of the individual pin 29 peripherally one key spaced ahead of the key and pin associated with the hole 28. This relationship is clearly illustrated in FIGURE 2. As there shown, the pin portion 29 of the key 30 is, in each case, of a radial length approximately one and three-quarters times the thickness of an individual band. This permits the individual pin 29 to seat snugly in the rear aperture 28 of its own respective band and to pass downwardly through that band into the aperture 27 of the next succeeding band in which it is loosely seated. By making the individual pins 29 slightly shorter than two band thicknesses, the pin will not interfere with the third band which passes immediately below the position of the respective aperture 27.

In operation, attempted rotation of the outer housing 13 relative to the driven shaft 11 in a clockwise direction as viewed in FIGURE 2 will cause a positive clutch drive. With such attempted movement, the precurve of the individual band 25 causes the edges of the individual band to grip the sides of the pulley groove 22 and the wrapping action caused by rotation of the housing 13 in the clockwise direction as viewed in FIGURE 2 causes a wedging action which positively locks the housing 13 against such clockwise rotation. Additionally, the angle faces 31 of the key 30 will co-operate with the angle faces 15 of the pockets 14 in housing 13 radially forcing the bands 25 tightly into groove 22. On the other hand, rotation of the housing 13 in a counter-clockwise direction as viewed in FIGURE 2, will, as a result of the slight frictional engagement of the edges of the individual bands with the sidewalls of the grooves 22, cause unwrapping of the individual bands permitting substantially free rotation of the housing 13 in the counter-clockwise direction relative to driven member 11.

It will be observed that by provision of the securely seated keys 30 having round pins 29, the individual bands 25 are free to pivot slightly relative to the individual keys 30 thereby assuring their proper seating in the V-groove 22. Although, as above noted, the strength of the individual bands is not limited by the strength of the securing portions of the bands, the relatively small diameter of pin 29 does not provide a weakness in the system. This is true since the pins 29 may, of course, be heat treated to provide a substantially greater strength and hardness than the spring metal bands 25.

In the embodiment illustrated in FIGURES 1 and 2, a relatively moderate load condition is envisaged. Under such operation, the total force transmitted by the individual bands is transmitted directly through the keys 30 and the rear apertures 28. However, should an unduly heavy load be applied, the individual bands 25, and the portions 26 thereof, will stretch thereby bringing the rear surface 27a of the individual second or forward apertures into contact with the radially inwardly projecting pins 29 thereby absorbing additional load. In order to accomplish this, it is preferred that the elongated aperture 27 have the rear edge 27a thereof immediately adjacent the respective pin 29 in assembly. In actual practice, a spacing of approximately 3/1000 of an inch from such pin permits an initial normal stretching of the band and causes the band to contact the pin with the forward or ahead aperture only after a substantial stressing of the band. Thus, it will be apparent that a very material safety factor is provided in the construction of the present clutch. The point at which this load sharing takes place may, of course, be modified by controlling the tolerance between the individual pins 29 and the trailing edges 27a of the respective bands 25, with the assistance being provided earlier as the tolerance is decreased.

In addition to the structural details set forth above, it is to be noted that in the clutch device illustrated, the edges of all six individual bands 25 contact the sidewalls 22. I have found during my experiments with such clutch devices that the clutch is satisfactorily operative even though several of the individual bands do not individually touch the sidewalls of the groove 22. Thus, for example, it is acceptable to manufacture alternate bands with a somewhat lesser width so that they do not contact the respective sidewalls at all. While it might at first glance appear that such a removal of side contact would substantially reduce the load-carrying characteristics of the clutch, nevertheless, experiments have shown that the output of the clutch is reduced only slightly with such a change. This result is due, apparently, to the fact that as the working bands, namely those bands having their side edges in engagement with the groove pulley 22, are engaged and wrappingly wedged into the groove 22, they squeeze the not working bands therebetween. This squeeze action provides substantially as great a torque force as the edge-to-edge torque transmission. By providing some worker bands and some non-worker bands, any dirt or other grit settling in any manner in the V-groove will be prevented from affecting the clutch by natural wiping movement into the areas between the side edges of the non-working bands and the sidewalls 22.

In applications of the clutch where the torque levels are high, the rather substantially beveled surface 31 applied to the key 30, is unnecessary. In such a case, the expense of the clutch may be further reduced by substituting a less expensive key shown in FIGURES 6 and 7. As there shown, the key is square and is provided with square edges rather than edges similar to the beveled edge 31 above mentioned. Further, the key is not provided with an arcuate cross-section. As a result, the construction of the key illustrated in FIGURES 6 and 7 is relatively simple and accordingly, substantially less expensive. It will be noted that even though the edges of the square key 30a are perpendicular to the general plane of the key, nevertheless, due to the width of the key, an effective bevel is provided relative to the radius line 17a. This effective bevel is an amount shown at A' and is ample under heavy loads to provide a positive inwardly directed force against the outer periphery of the clutch bands.

In the embodiment of the invention illustrated in FIGURES 8 and 9, special provision is made for heavy duty operation under conditions of intermittent impact. As is known by those familiar with the automotive field, automotive starter drive mechanisms of the type employing overrunning clutches place an unusually heavy load upon the clutch. While ordinarily the maximum starting torque passed through the clutch would comprise on the order of 10 to 15 foot pounds, nevertheless an occasional extremely large effective torque may be applied to the clutch. For example, torque supplied to the starter clutch by an occasional backfire of the engine during the starting procedure may apply a torque to the starter drive approximating 100 foot pounds or approximately 10 times the usual starting torque. Manifestly, a clutch usable in such an automotive system must, accordingly, be sufficiently strong to withstand an occasional 100 foot pound torque application.

In the past, clutches employed in automotive starter systems have been required to handle torques as high as 100 foot pounds without failure. These requirements have necessitated a larger starting clutch than is required for the ordinary starting operation. In accordance with the embodiment of the invention shown in FIGURES 8 and 9, however, the overall clutch size maybe be determined by a maximum ordinary starting load, ignoring the occasional backfire condition. Thus, for example, the parts may be constructed to withstand a normal starter drive torque plus a safety factor, giving, for example, a total torque acceptance of approximately 50 foot pounds. This is accomplished without endangering the clutch parts from intermittent overload from backfire conditions.

As may be seen from a consideration of FIGURES 8 and 9, the shafts 10 and 11 are identical to those employed in the embodiment of FIGURES 1 and 2. Similarly, the V-groove member 21 and the bands 25 seated therein are identical to those illustrated in FIGURES 1 and 2. The bands are, however, keyed to pins 29' formed integrally with an outer ring 33 which is press-fitted into sheet metal housing recess 34 welded to housing portion 130, as at 35. Alternatively, of course, the sheet metal portion 34 and the main housing portion 130 may be constructed integrally by forging the relatively thinner portion 34 from the main body of metal forming the housing 130. As illustrated, the pins 29' are formed integrally with the strip 33 by coining the metal of the pin 29' from the material of the strip 33, leaving a dimple in the outer surface, as at 36. The strip 33 may be constructed of a single piece formed into a circle and press-fitted into the sheet metal cup or recess 34. Of course, the strip 33 may be composed of two or more parts if desired, but the one-piece form illustrated is eminently satisfactory. In assembly of the arrangement shown in FIGURES 8 and 9, the bands are assembled into position in the groove of member 21 and the strip 33 deformed, by separating its ends 33a and 33b from each other sufficiently to permit the pin portions 29' to be passed over the outermost band and snapped into the openings 28 and 27 in the several bands. In manufacture, the tightness of the press fit may be adjusted by controlling the precise length of the strip 33 as well as the thickness of the metal of the housing portion 34. The tolerances in this respect can be quite large in view of the fact that the maximum ordinary starting torque approximates 15 foot pounds while the design structural limitations are, as above noted, approximately 50 foot pounds. In these circumstances, it is preferred that the press fit be sufficiently tight to prevent any rotation between the strip 33 and the housing 34 below approximately 25 pounds but permitting slip above that torque. By this arrangement, backfire torques do not injure the clutch parts and the clutch may, accordingly, be constructed in a far less expensive and less rugged manner than clutches heretofore employed.

It will be apparent, accordingly, that I have provided a greatly improved one-way band-type clutch. Since it is also apparent that variations may be made in accordance with the principles of the present invention without departing from the novel concepts thereof, it is my intention that the scope of the present invention be limited solely by that of the hereinafter appended claims.

I claim as my invention:

1. A clutch comprising a first member having an externally facing peripheral V-groove therein, a second clutch member having an internally facing pocket positioned over and facing said groove, a torque-transmitting band precurved to overlap itself and wrappingly engage the sidewalls of said V-groove, one end of said band extending out of said groove and being enlarged to a width substantially greater than the width of said groove and means connecting said one end of said band in said pocket, said means comprising an outwardly projecting portion secured to said one end of said band against longitudinal movement relative thereto in the pocket, the projecting portion and its pocket having contacting torque-transmitting surfaces lying in substantially parallel planes inclined at an angle to a plane defined by the axis of rotation of said members and a radius line drawn through said surfaces, said outwardly projecting portion comprising a key secured to said band by a cylindrical pin rigid with said key and pivotally secured to said band on an axis generally radial to said axis of rotation.

2. A clutch comprising a first member having an externally facing peripheral V-groove therein, a second clutch member having a plurality of internally facing pockets positioned adjacent and over said grooves, a plurality of torque-transmitting bands each being precurved to wrappingly engage the sidewalls of said V-groove, one end of said band extending out of said groove and being enlarged to a width substantially greater than the width of said groove and means connecting said one end of each of said bands in a respective pocket, said means comprising an outwardly projecting portion secured to said one end of said band against longitudinal movement relative thereto in a respective pocket, said projecting portion and its respective pocket having contacting torque-transmitting surfaces lying in substantially parallel planes inclined at an angle to a plane defined by the axis of rotation of said members and a radius line drawn through said surfaces, said outwardly projecting portion comprising a key separable from said band and connected to said one band by a pin and aperture connection providing a pivotal action about a line drawn radial to said axis of rotation.

3. A clutch comprising a first member having an externally facing peripheral V-groove therein, a second clutch member having a plurality of internally facing pockets positioned adjacent and over said groove, a plurality of torque-transmitting bands each being precurved to wrappingly engage the sidewalls of said V-groove, one end of said band extending out of said groove and being enlarged to a width substantially greater than the width of said groove and means connecting said one end of each of said bands in a respective pocket, said means comprising an outwardly projecting portion secured against longitudinal movement relative to said band and positioned in a respective pocket, said projecting portion and its respective pocket having contacting torque-transmitting surfaces lying in substantially parallel planes approximately radial of said axis, said outwardly projecting portion being pivotally secured to said band along an axis approximately radial of said axis of rotation of said clutch members.

4. A clutch comprising a first clutch member having an externally facing peripheral V-groove therein, a second clutch member, a plurality of torque-transmitting bands each being precurved to wrappingly engage the sidewalls of said V-groove, one end of said band extending out of said groove and being enlarged to a width substantially greater than the width of said groove, and means connecting said one end of each of said bands peripherally to said second clutch member to prevent longitudinal relative movement therebetween, said means further comprising a plurality of pin and aperture connections between each said band and said second clutch member whereby the load transmitted from a single band to said second clutch member is applied to more than one pin.

5. A clutch comprising a first clutch member having an externally facing peripheral V-groove therein, a second clutch member, a plurality of torque-transmitting bands each being precurved to wrappingly engage the sidewalls of said V-groove, one end of said band extending out of said groove and being enlarged to a width substantially greater than the width of said groove, and means connecting said one end of each of said bands peripherally to said second clutch member to prevent longitudinal relative movement therebetween, said means further comprising a plurality of pin and aperture connections between said one end of each said band and said second clutch member whereby the load transmitted from a single band to said second clutch member is applied to more than one pin, at least one of said connecting means having a slight clearance longitudinal of said band relative to at least one of said pin and aperture connections and the remaining connections being tensioned into torque-transmitting connection by torque applied to said band by said clutch.

6. A clutch comprising a first member having an externally facing peripheral V-groove therein, a second clutch member having a plurality of internally facing pockets positioned adjacent and over said groove, a plurality of torque-transmitting bands each being precurved to wrappingly engage the sidewalls of said V-groove, one end of said band extending out of said groove and being enlarged to a width substantially greater than the width of said groove and means connecting said one end of each of said bands in a respective pocket, said means comprising an outwardly projecting portion secured to said one end of said band against longitudinal movement relative thereto in a respective pocket, said projecting portion and its respective pocket having contacting torque-transmitting surfaces lying in substantially parallel planes inclined at an angle to a plane defined by the axis of rotation of said members and a radius line drawn through said surfaces, said outwardly projecting portion comprising a key secured to at least one of said bands by a cylindrical pin rigid with said key and pivotally secured through said one band on a pivot axis generally radial to said axis of rotation.

7. A clutch comprising a first clutch member having an externally facing peripheral V-groove therein, a second clutch member, a plurality of pins drivingly connected extending radially inwardly toward said V-groove, a plurality of torque-transmitting bands each being precurved to rapidly engage the sidewalls of said V-groove and having its outer end projecting beyond the groove and having a width substantially wider than said groove, and means connecting said bands peripherally to said pins and comprising an aperture in the portion of each said band of a width greater than the width of said V-groove.

8. A clutch comprising a first clutch member having an externally facing peripheral V-groove therein, a second clutch member, a plurality of internally facing and radially extending pins, a plurality of torque-transmitting bands each being precurved to wrappingly engage the sidewalls of said V-groove, each of said bands having an enlarged end extending out of said groove and having a width substantially greater than the width of said groove, said end having a plurality of apertures therein for cooperation with a plurality of said pins whereby the load transmitted from a single band to said second clutch member may be applied to more than one pin, and means drivingly connecting said pins to said second clutch member.

9. A clutch comprising a first clutch member having an externally facing peripheral V-groove therein, a second clutch member, a plurality of pins extending radially inwardly toward said V-groove, a plurality of torque-transmitting bands each being precurved to rapidly engage the sidewalls of said V-groove, and means connecting said bands peripherally to said pins and comprising an aperture in a portion of said band of a width greater than the width of said V-groove, said pins being rigidly secured to a ring member which is in turn press-fitted into said second clutch member providing an overload slip connection between said ring member and said second clutch member.

10. A clutch comprising a first clutch member having an externally facing peripheral V-groove therein, a second clutch member having a plurality of pins drivingly connected thereto and extending radially inwardly toward said V-groove, a plurality of torque-transmitting bands each being precurved to rapidly engage the sidewalls of said V-groove, and means connecting said bands peripherally to said pins and comprising an aperture in a portion of said band of a width greater than the width of said V-groove, and said driving connection providing an overload slip connection between said pins and said second clutch member.

11. A clutch comprising a first clutch member having an externally facing peripheral V-groove therein, a second clutch member, a plurality of internally facing and radially extending pins, a plurality of torque-transmitting bands each being precurved to wrappingly engage the sidewalls of said V-groove, each of said bands having an enlarged end extending out of said groove and having a width substantially greater than the width of said groove, said end having a plurality of apertures therein for co-operation with a plurality of said pins whereby the load transmitted from a single band to said second clutch member may be applied to more than one pin, and means providing an overload slip connection between each of said pins and said second clutch member.

12. In combination in a clutch, a first shaft member drivingly connected to a first clutch member and a second shaft member drivingly connected to a second clutch member, said first clutch member having an externally facing peripheral V-groove therein, said second clutch member having a plurality of pins drivingly connected thereto and extending radially inwardly toward said V-groove, a plurality of torque-transmitting bands each being precurved to rapidly engage the side walls of said V-groove, means connecting said bands peripherally to said pins and comprising an aperture in a portion of said band of a greater width than the width of said V-groove, said bands wedgingly engaging said groove to provide a one-way drive connection, and means providing an overload slip connection between said shafts.

13. A clutch comprising a first clutch member having an externally facing peripheral V-groove therein, a plurality of torque-transmitting bands each being precurved to lie in and rapidly engage the sidewalls of said V-groove, a second clutch member coaxially rotatable with said first clutch member, means drivingly connecting said bands individually peripherally to said second clutch member, said last named means providing an overload friction slip connection between said bands and said second clutch member.

14. A clutch comprising a first clutch member having an externally facing V-groove therein, a second clutch member having a plurality of pins drivingly connected thereto and facing radially inwardly toward said V-groove, a plurality of torque-transmitting bands, each being precurved to rapidly engage the sidewalls of said V-groove and means connecting said bands peripherally to said pins, and comprising an aperture in a portion of each said band, and means providing an overload slip connection between each of said pins and said second clutch member.

References Cited in the file of this patent

UNITED STATES PATENTS

| | | |
|---|---|---|
| 2,422,533 | Dodwell | June 17, 1947 |
| 2,518,453 | Dodwell | Aug. 15, 1950 |
| 2,895,577 | Dodwell | July 21, 1959 |
| 2,917,144 | Dodwell | Dec. 15, 1959 |

FOREIGN PATENTS

| | | |
|---|---|---|
| 557,859 | France | May 12, 1923 |